March 15, 1960 D. J. LUND Re. 24,798

FINGER RING ASSEMBLING AND RETAINING MEANS

Original Filed July 8, 1955

Donald J. Lund
INVENTOR.

BY Clarence A. O'Brien and Harvey B. Jacobson
Attorneys

United States Patent Office

Re. 24,798
Reissued Mar. 15, 1960

24,798

FINGER RING ASSEMBLING AND RETAINING MEANS

Donald J. Lund, Bismarck, N. Dak.

Original No. 2,761,294, dated September 4, 1956, Serial No. 520,738, July 8, 1955. Application for reissue March 11, 1958, Serial No. 726,596

4 Claims. (Cl. 63—15.2)

Matter enclosed in heavy brackets [ ] appears in the original patent but forms no part of this reissue specification; matter printed in italics indicates the additions made by reissue.

This invention relates, broadly construed, to means whereby two finger rings, a diamond ring and wedding ring, for example, may be paired and maintained in such paired relationship on a single finger of the wearer.

Jewelers are repeatedly called upon to cope with the problem of enabling the wearer of a finger ring, which is too large, to solve the problem so that the ring will stay in its intended position, especially a diamond or an equivalent ring. Keeping in mind the fact that the knuckle on the ring finger has to be cleared by the ring when it is applied, the ring, if it is loose, will twist and turn in a well known manner. Various slack take-up and play compensating devices are, of course, available to remedy the situation. It is an obvious object here to structurally, functionally and otherwise improve upon similarly constructed and performing prior art adaptations and, in doing so, to appropriate a construction which, it is believed, will not only satisfy the manufacturing requirements of manufacturers, but the trade and other requirements of jewelers and retailers, and, more importantly, the needs of the wearers of finger rings.

It is also generally well recognized in the field of invention under consideration that adapters and finger ring retainers which overcome undesirable looseness are of many and varied styles and forms. The instant invention is an improvement in that it does two things; namely, clamps two rings together in spaced parallel axial alignment and provides satisfactory compensating means whereby both rings may be clamped together and slipped over the knuckle and then satisfactorily adapted and fitted to the portion of the finger between the hand and knuckle to thus achieve this desired new result in a highly satisfactory and effective manner.

Other objects, features and advantages will become more readily apparent from the following description and the accompanying sheet of drawings.

Since it is admitted that retainers for single finger rings are old, it will be clear that the subject matter and disclosure is here concerned with two rings; namely, a so-called diamond ring A and a wedding band or ring B. The latter is not detailed here, since the concept involves having rings A and B in spaced parallel relationship and axially aligned so that they may both be simultaneously worn on a single finger.

The invention in its preferred embodiment is characterized by suitable means, a holder for example, which will function to assemble the rings in the order stated and will keep the same in this relationship and will at the same time provide necessary slack take-up or compensating means to cause the rings to "stay put."

Figure 1:
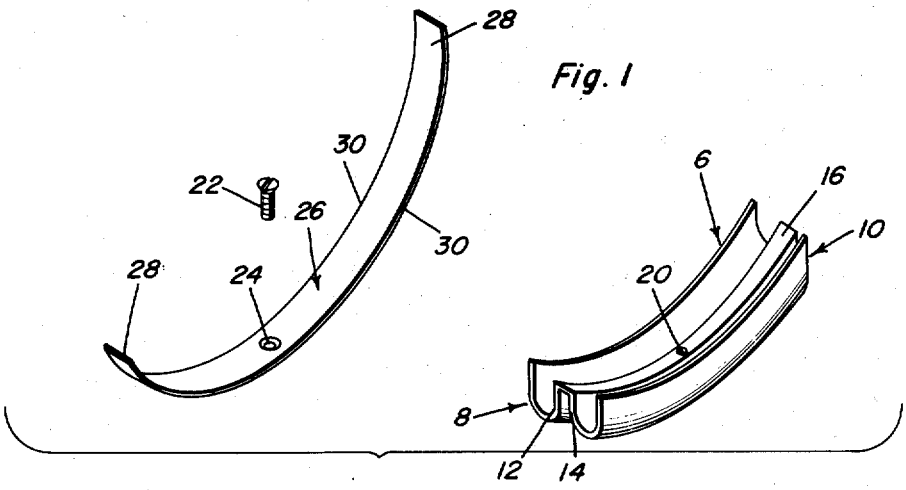
Figure 1 is a perspective view of an "exploded" type showing the ring assembling and finger adapting and holding device constructed in accordance with the invention.
Figure 2:
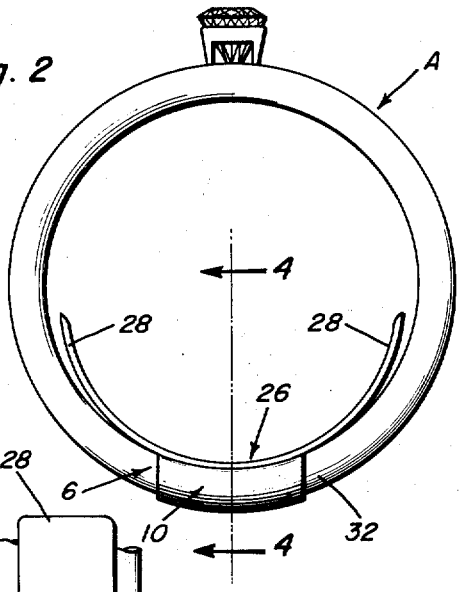
Figure 2 is an elevational view illustrating how the device is used.
Figure 3:
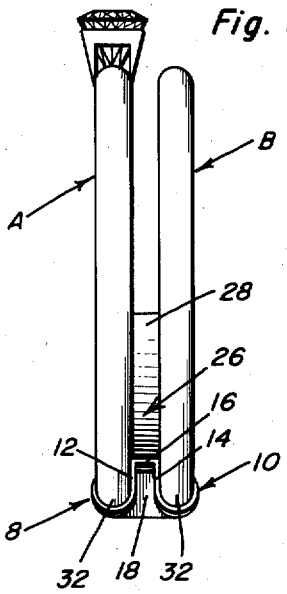
Figure 3 is an edge elevation, that is, a view observing the illustration in Figure 2 in a direction [, let us say,] from right to left.
Figure 4:
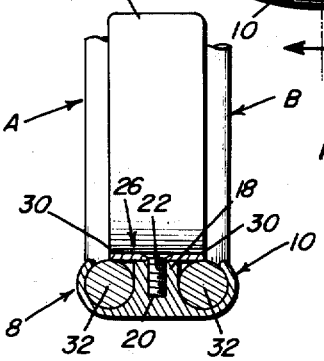
Figure 4 is an enlarged fragmentary section on the line 4—4 of Figure 2, looking in the direction of the arrows.

More specifically, the holder is preferably, but not necessarily, of a dual type and its principal part is denoted by the numeral 6. It is of short arcuate form in elevation, and is characterized by a pair of open-ended channel-shaped individual ring receivers 8 and 10, respectively. These are virtual duplicates one of the other, and they are arranged in spaced parallel relation for the obvious reasons revealed, and their inner channel walls 12 and 14 are disposed in [closed] *close* spaced parallelism. In fact, these walls are joined by a correspondingly curved or arcuate part which is here referred to as a web 16. Midway between the ends of the two channel-shaped receivers 8 and 10, there is a block-like boss 18 which, as shown in Figure 4, has a vertical axial screw threaded socket 20 to accommodate the shank 22 of an assembling screw or equivalent headed fastener. This passes through a screw hole 24 in an arcuate resilient metal slack take-up and adjusting or adapting band 26. This has its intermediate portion contacting the major surfaces of the web 16, the parts being assembled by passing the screw 22 through the hole 24 and into the socket 20. The arcuate metal band, however, is of a length greater than the ring holder 6. Therefore, the flexibly resilient ends 28 are located within the inner perimeter limits of the rings and the longitudinal edge portions 30 (Figure 4) overlie the adjacent [limited] *inner surface* portions 32 of the rings, thus holding the rings in the channels and at the same time, providing the slack take-up means desired.

The invention is therefore characterized by two units; namely, the dual holder 6 with its channel-shaped ring receivers and the resilient finger embracing and slack compensating band 26. The latter is especially novel in that the edges 30—30 overlie the ring portions 32—32, as brought out in Figure 4, whereby to thus cause the hand to serve not only as means for clamping the rings in the holder device 26 but also affording the retention action of the free end portions 28—28.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a first finger ring, a second finger ring, and means connecting said rings one to the other in axially aligned spaced parallelism, said means comprising a receiver having two substantially parallel arcuate channel portions for receiving the outer peripheral arcuate portions of the said rings, and an assembling and clamping member removably mounted between said channels on said receiver and having portions overlying said [clamping] rings in the said channels, said member being of a normal radius less than the radius of the inside surface of said rings and having free end portions constituting self-adjusting slack take-up adapters.

2. Assembling and retaining means for a pair of finger rings which are adapted to be axially aligned and maintained in approximately spaced parallelism, said means comprising a holder having a pair of rigidly united spaced parallel arcuate receivers, each channel-shaped in cross-section and having its opposite ends open, and a ring assembling and clamping member comprising an elongate flexibly resilient curvilineal band having its centrally disposed arcuate portion removably attached to an intermediate portion of said holder, said band except for said attached portion being completely free of connection with the holder and having arcuately shaped end portions constituting self-adjusting space take-up adapters, said member being of a normal radius less than the radius of the inside surface of said rings and having lengthwise edge portions overlapping the respective channel portions of said receivers in a manner to clampingly retain the respective rings in their respective receivers.

*3. A holder for retaining a pair of finger rings in axial alignment and spaced parallelism, said holder comprising an arcuate member having a pair of arcuate spaced parallel channel-shaped continuous receivers having open ends and having the inner edges rigidly interconnected by a continuous arcuate web, said receivers adapted to receive the outer peripheral arcuate portions of a pair of rings, and an arcuate clamping band in overlying relation to the inner surface of the arcuate member with the side edges thereof overlapping a portion of each of the channel-shaped receivers with the band having a length at least substantially equal to the length of the arcuate member, screw-threaded means interconnecting the band and the arcuate web thereby rigidly and removably holding a pair of rings in axial alignment and spaced parallelism, said band adapted to be disposed against the inner arcuate surfaces of a pair of rings with the ends thereof forming inwardly projecting means for engagement with a finger inserted into the pair of rings for preventing rotation of the rings on the finger, said web being adapted to be disposed between the adjacent edges of the rings with the inner surfaces of the receivers being parallel thereby maintaining the rings in spaced parallelism, said screw-threaded means extending through the web of said arcuate member and having a headed-end substantially flush with the inner surface of the band, said band effectively reducing the diameter of a ring with the band and projecting means formed by the ends thereof adapted to deform the flesh of the finger and become embedded therein whereby the engagement between the ends of the band and the flesh of the finger will prevent rotation of the rings on the finger.*

*4. In combination with a pair of finger rings adapted to be mounted in adjacent relation on a ring finger by longitudinal movement onto the finger with the rings being subject to movement in relation to each other and in relation to the finger; that improvement comprising a holder rigidly interconnecting the rings, said holder including an arcuate member having a pair of continuous open-ended channel-shaped receivers therein receiving outer peripheral arcuate portions of the rings, said channel-shaped receivers being rigidly interconnected by a continuous web extending between the inner edges of the receivers and retaining the receivers in spaced parallelism, an arcuate clamping band disposed against the inner peripheral arcuate portions of the rings and having a length at least substantially equal to the length of the arcuate member, the side edges of the band overlapping a longitudinal portion of each receiver, and fastener means removably interconnecting the band and member for rigidly holding the rings in the receivers in spaced parallelism and preventing relative movement between the rings, the ends of said band forming inwardly extending projections extending inwardly from the inner surface of the rings for frictional contact with the flesh of the finger with the projections preventing rotation of the rings in relation to the finger.*

References Cited in the file of this patent or the original patent

UNITED STATES PATENTS

| | | |
|---|---|---|
| 324,734 | Seldner | Aug. 18, 1885 |
| 593,872 | Barnhart | Nov. 16, 1897 |
| 785,881 | Hill | Mar. 28, 1905 |
| 858,450 | Greenbaum | July 2, 1907 |
| 1,115,764 | Applas | Nov. 3, 1914 |
| 1,542,087 | Phoel | June 16, 1925 |
| 2,262,513 | Novack | Nov. 11, 1941 |
| 2,281,231 | Campana | Apr. 28, 1942 |
| 2,555,904 | Seidman | June 5, 1951 |

FOREIGN PATENTS

| | | |
|---|---|---|
| 474,313 | Canada | June 12, 1951 |